United States Patent Office 3,611,671
Patented Oct. 12, 1971

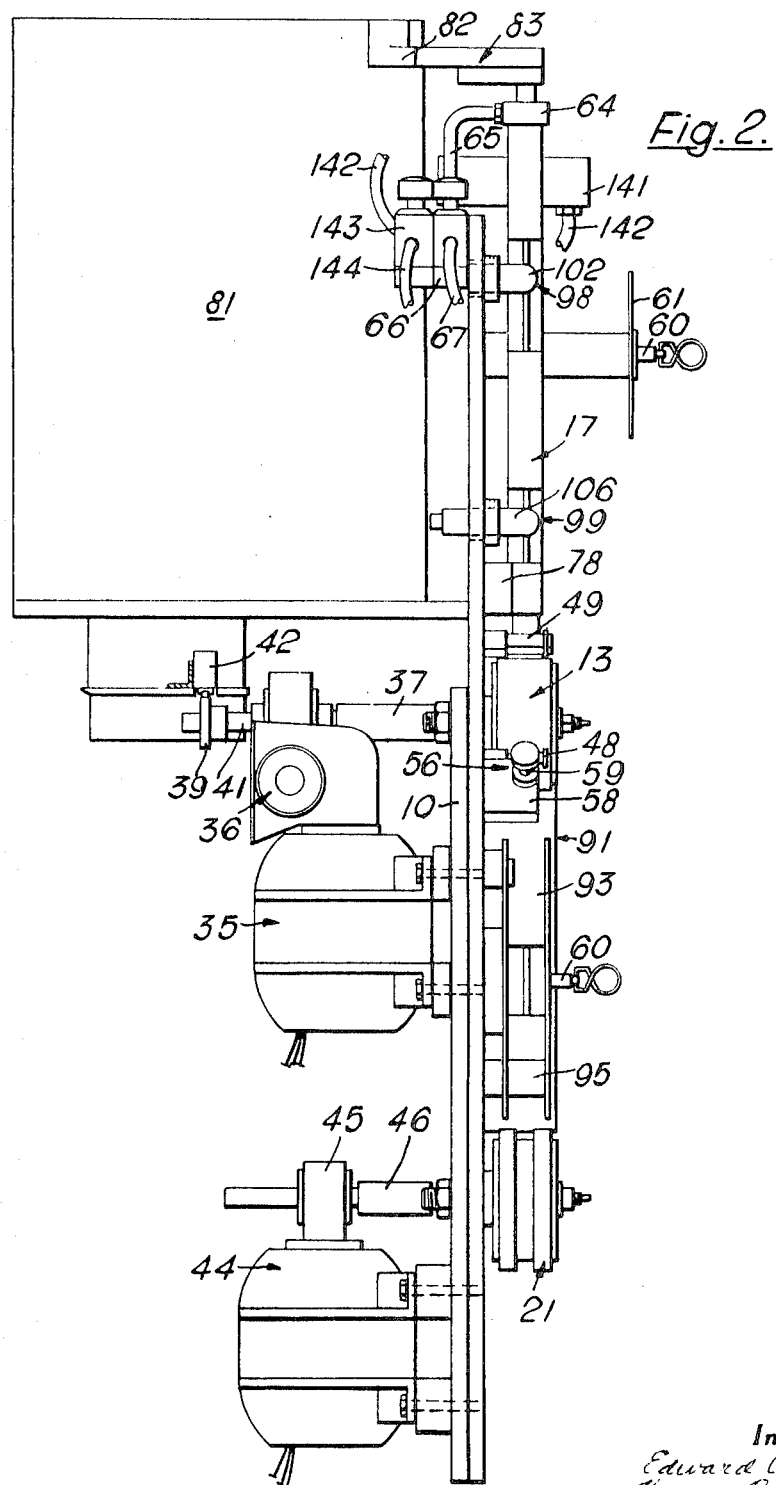

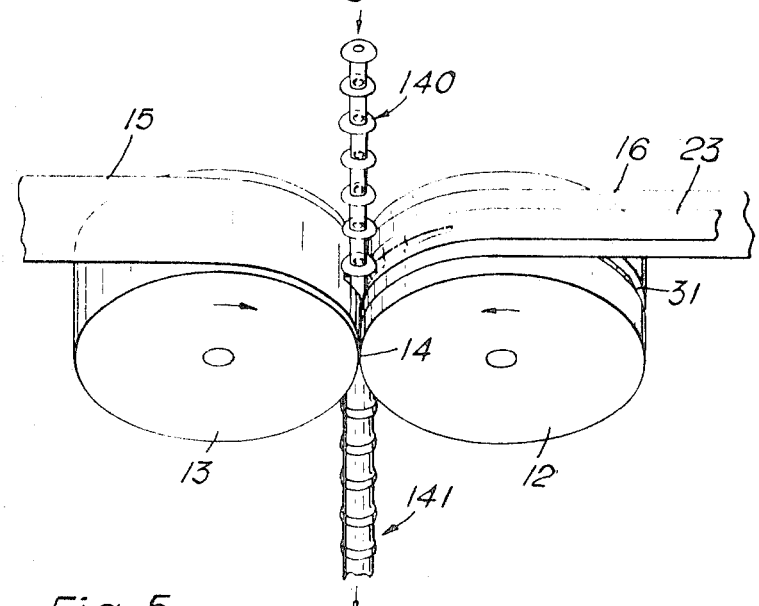
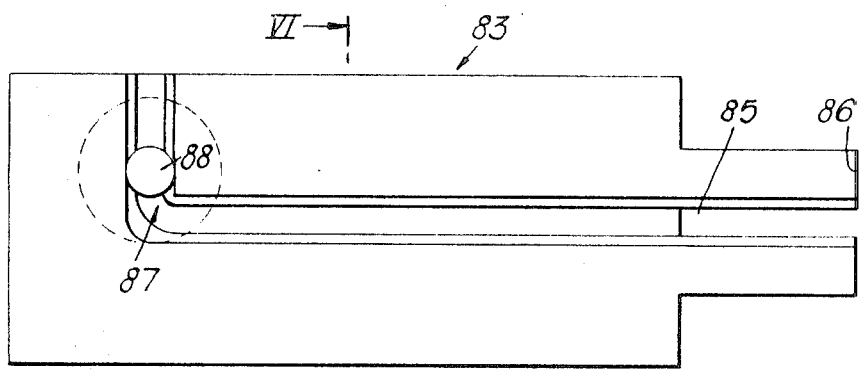
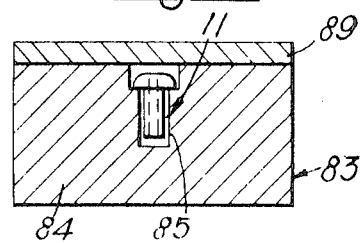

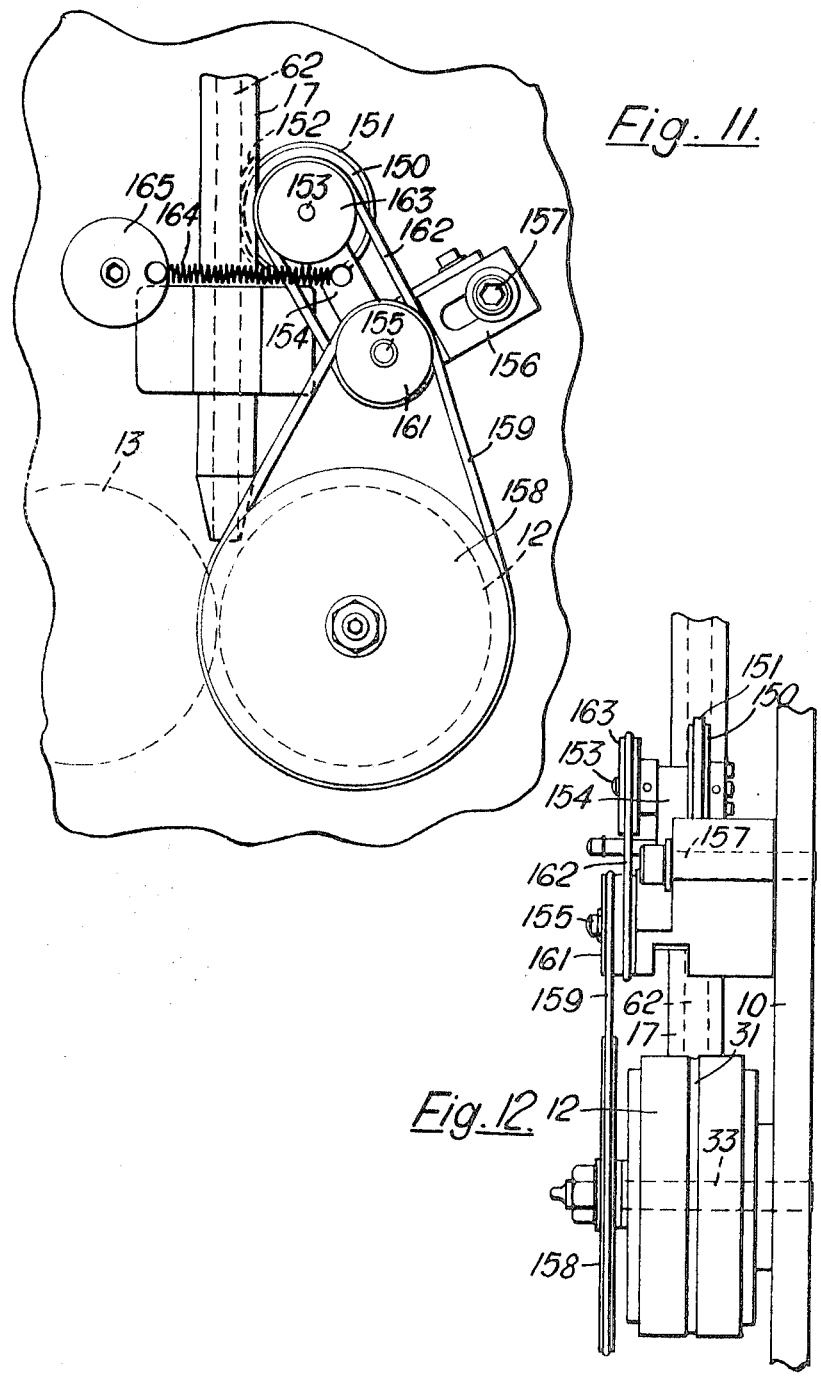

3,611,671
PACKAGING APPARATUS
Edward A. Skinner and Thomas C. Rathbone, Welwyn Garden City, England, assignors to Aerpat A.G.
Filed July 7, 1969, Ser. No. 839,396
Claims priority, application Great Britain, July 9, 1968, 32,712/68
Int. Cl. B65b 9/12, 57/12
U.S. Cl. 53—59
17 Claims

ABSTRACT OF THE DISCLOSURE

In a machine for continuously packaging tubular rivets in end-to-end configuration, a succession of rivets is fed down a tube, with the assistance of a stream of compressed air, to a packaging station provided by the nip of two packaging rollers each having a resilient rubber surface. Two packaging tapes are fed between the packaging rollers, one tape on each side of the succession of rivets, to enclose the rivets. At least one of the tapes has an adhesive surface which is pressed into contact with the other tape by the packaging rollers. A narrow masking tape may be included to protect the column of rivets from contamination by the adhesive, if required. One of the packaging rollers is provided with a perforator blade to perforate the package into lengths each equal to the circumference of the roller. The preforated package emerging from the packaging rollers passes through the nip of a pair of stripper rollers, which rotate at a higher peripheral speed than the packaging rollers and are spaced from the packaging rollers by a distance greater than one length of perforated package but less than two lengths of perforated package. The stripper rollers separate each length of package away from the following one at the perforations between them. The rivet feed tube is provided with rivet sensing devices which are connected to control the drive to the packaging rollers, so that the packaging rollers operate only when there is a column of rivets in the feed tube sufficient to fill at least one length of package.

---

The invention relates to packaging apparatus. More particularly, the invention relates to packaging apparatus for packaging a plurality of articles of the type which is elongated in shape and has an internal bore extending completely throughout its length. Such articles will hereinafter be referred to as "articles of the type defined." One example of such an article is a tubular rivet which has an elongated tubular body with a radially enlarged head at one end, for example the rivet widely known under the registered trademark "Chobert."

The invention provides packaging apparatus for packaging a plurality of articles of the type defined in end-to-end relationship, which apparatus comprises:—packaging material feeding means for feeding packaging material to a packaging station; article feeding means for feeding a succession of the articles to the packaging station in end-to-end relationship; and packaging means at the packaging station for enclosing the succession of articles in the packaging material to form an elongated package with the articles in end-to-end relationship and with their bores substantially in alignment; in which the article feeding means comprises a tube-like guide along which the succession of articles is fed and from which they emerge at the packaging station.

Preferably the tube-like guide is positioned substantially vertically, so that the articles move along it towards the packaging station under the urging of gravity.

It may be that the packaging apparatus includes means for providing a stream of air (or other convenient gas) along at least part of the guide to assist movement of the articles therealong. It may be that vibrating means are provided for vibrating at least part of the guide to assist movement of the articles therealong. It may be that both such means for providing a stream of air, and such vibrating means, are provided.

Preferably the packaging apparatus includes sensing means for sensing the presence or absence of articles in the guide. This sensing means may be arranged to control actuation of the packaging means so that, when the sensing means senses the absence of articles, actuation of the packaging means is stopped. In a preferred form of packaging apparatus, there are provided first sensing means at a first position along the guide spaced from the packaging station, and second sensing means at a second position along the guide which is further along the guide away from the packaging station than is the first position. The arrangement may then be such that actuation of the packaging means is stopped when the first sensing means senses the absence of articles in the guide at the first position, and is not started again until both the first sensing means and the second sensing means sense the presence of articles in the guide at the first and second positions respectively.

The tube-like guide may be provided with a pair of opposed apertures in its wall at the or each detecting position, the associated sensing means comprising means for passing a beam of radiation (e.g. visible light) across the interior of the tube-like guide through the pair of apertures, and radiation detecting means for detecting when the beam is broken by the presence of an article or articles in the guide between the apertures at the detecting position. When the packaging apparatus includes means for providing a stream of air (or other convenient gas) along the guide as aforesaid, the aforesaid apertures may also allow escape of the gas from the guide.

Preferably the packaging apparatus includes means for cutting or perforating the elongated package into predetermined lengths. When the apparatus includes sensing means for sensing the presence or absence of articles in the guide as aforesaid, preferably the sensing means is arranged to sense the presence or absence of articles as aforesaid at a position along the guide spaced therealong away from the packaging station by a distance adequate to contain in use of the apparatus, at least a sufficient number of articles to fill one of the aforesaid lengths of package. When the packaging apparatus includes first and second sensing means at first and second positions along the guide as aforesaid, preferably the second position is spaced from the packaging station by a distance which is adequate to contain, in use of the apparatus, at least a sufficient number of articles to fill one of the aforesaid lengths of package.

In a preferred form of packaging apparatus, the packaging station is the nip of a pair of rollers which forms the packaging means. Preferably one of the rollers includes a perforator or cutter device on its face to provide the aforesaid means for cutting or perforating the elongated package into lengths.

It may be that the cutter or perforator device does not completely separate one length of package from the next, and that the apparatus includes separating means for separating the lengths of package.

The separating means may comprise a second pair of rollers into which the package is fed after its emergence from the packaging rollers, the second pair of rollers being positioned with their nip at a distance away from the nip of the packaging rollers which is greater than one length of package but less than two lengths of package, the second pair of rollers being arranged to rotate with a circumferential speed higher than that of the package forming rollers.

It may be that the apparatus includes means within the tube-like guide adjacent the packaging station for positively urging articles towards the packaging station at a rate higher than the rate at which they pass through the packaging station, thereby to ensure the arrival at the packaging station of a succession of articles each in contact with the adjacent articles to be packaged. The said means may be provided by the periphery of a wheel protruding into the tube-like guide to engage articles passing therealong, the wheel being driven (when the packaging apparatus is in operation) so that its periphery moves at a speed higher than the speed at which the succession of articles can pass through the packaging station. Preferably the periphery of the wheel moves at about one and a half times the said speed of the articles through the packaging station.

Two specific embodiments of the invention, together with a modification of one of them, will now be described by way of example and with reference to the accompanying drawings, in which:

FIG. 2 is a side elevation of the machine (the packaging webs being omitted for clarity of illustration);

FIG. 4 is a diagrammatic perspective view, not to scale, illustrating how the package is formed;

FIG. 5 is a plan view of part of a guideway for supplying rivets to the guide member;

FIG. 6 is a section on the line VI—VI of FIG. 5, also showing one of the rivets to be packaged;

FIG. 11 is a front elevation and FIG. 12 is a side elevation of a modification of the machine illustrated in FIGS. 1–10.

(FIGS. 1, 2, 13 and 14 are to a smaller scale than the remainder of the figures.)

Figure 1:
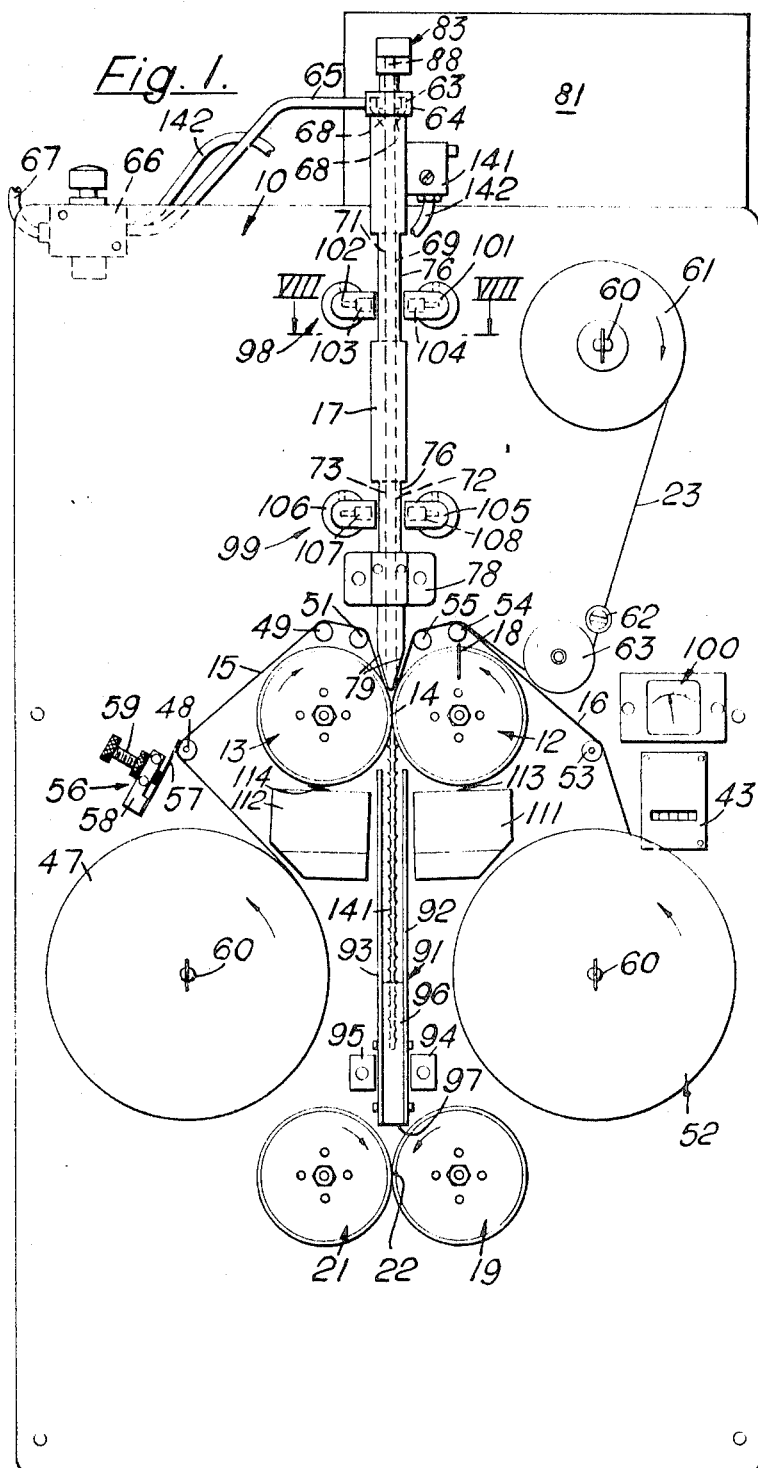
FIG. 1 is a front elevation of a first rivet packaging machine.

The rivet packaging machines of these examples are intended to package continuously a succession of tubular rivets which are widely known throughout the world under the trademark "Chobert." One such rivet 11 is illustrated in FIG. 6, and comprises an elongated tubular body with a radially enlarged snap head at one end.

The machines of the two examples are substantially similar in construction and operation. Accordingly only the first example machine, illustrated in FIGS. 1 to 10, will be described in detail.

The major components of the rivet packaging machine are mounted upon a vertically positioned strong steel panel 10. The machine comprises a pair of resilient faced package-forming rollers 12, 13 arranged to rotate, in opposite directions as indicated by the arrows in FIG. 1, about parallel horizontal axes to provide a nip 14. Means are provided for feeding two webs 15, 16 of packaging material into the nip of the rollers in superposed relationship. In this example, the web 15 is a paper tape about one inch wide, and the web 16 is a transparent cellulose plastics tape about three quarters of an inch wide, with one face coated with adhesive, the adhesive-coated face being arranged to face towards the paper tape 15 when the webs are fed between the rollers 12, 13. Means for feeding a succession of rivets in end-to-end relationship into the nip of the package-forming rollers between the two tapes includes a tube-like guide in the form of a feed tube 17 arranged vertically with its axis along the line of common tangent to the peripheries of the two package-forming rollers 12, 13 at their nip 14. The package-forming roller 12 is provided with a perforator comb 18 at one position around its circumference, to perforate the formed package emerging below the nip of the rolls into lengths at a distance apart equal to the circumference of the roller 12. In this machine, means is provided for separating the perforated lengths of package, in the form of a pair of stripper rollers 19, 21 also arranged to rotate about parallel horizontal axes and positioned with their nip 22 vertically below the nip 14 of the package-forming rollers 12, 13.

This machine also incorporates means for feeding a third web 23, narrower than the webs 15 and 16, between the adhesive face of the web 16 and the succession of rivets. This web 23, in this example, is provided by a narrow vinyl plastics tape, the function of which in the formed package will be described later.

The various parts of the machine will now be described in greater detail.

Figure 3A:
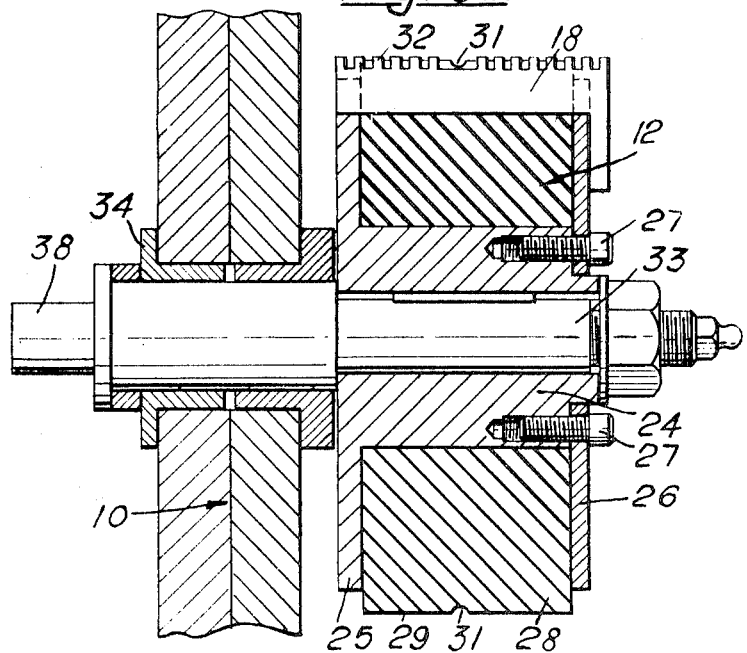
FIG. 3a is an axial section through one packaging roller which incorporates a perforator device.

As shown in FIG. 3a, the package-forming roller 12 comprises a hub 24 having one integral flange 25 and a second flange 26 secured to the hub by screws 27. The hub carries an annular resilient polyurethane rubber tyre 28 having a cylindrical peripheral surface 29 which projects beyond the flanges. Approximately mid-way across its face 29 the tyre has an annular groove 31 of cross-section slightly less than a semi-circle. That is to say, the depth of the groove is slightly less than half of its width. The diameter (i.e. width) of the groove is chosen to be approximately equal to the head diameter of the rivets to be packaged. The perforator comb 18 which the roller 12 carries is provided with teeth 32 which project beyond the surface 29 of the rubber tyre 28. The comb has a gap in its teeth at the position aligned with the groove 31, so that no teeth project into the groove 31 or for a distance each side of the groove. The hub 24 is keyed on to a shaft 33 which is journaled in a bearing 34 mounted in the panel 10. The roller 12 is driven by means of an electric motor, 35, mounted on the rear of the panel 10, through reduction gearing 36 and a coupling 37 which couples to the rear end 38 of the shaft 33.

The other package-forming roller 13 is generally similar to the roller 12, except that it has no annular groove (i.e. its peripheral surface is plain); that it has no performator comb; and that it is an idler roller. That is to say, it is not driven through its axle shaft but rotates in the opposite direction to the roller 12 due to the frictional contact between the rollers.

In order to count the number of lengths of package which pass through the package-forming rollers, a counter is provided in the form of a cam 39 secured to a rearward extension 41 of the final drive shaft of reduction gearing 36 which drives the roller 12, a micro-switch 42 arranged to be actuated by the cam 39 once in every revolution of the roller 12, and an electro-magnetic counter 43 connected to the micro-switch 42 and mounted in a convenient position on the panel 10.

Figure 3B:
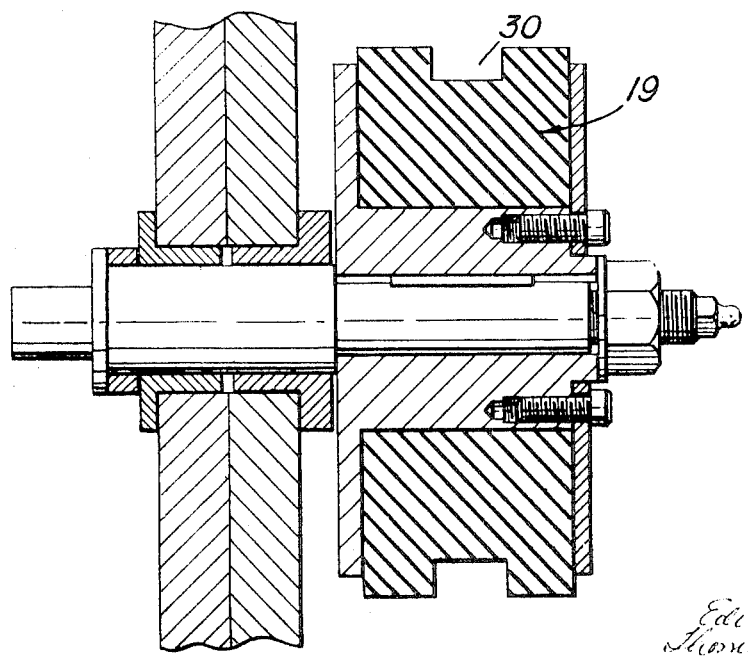
FIG. 3b is an axial section through one of the rollers forming separating means.

The stripper rollers 19, 21 are identical with each other and generally similar to the package-forming rollers 12, 13 respectively, in general construction. However, as shown in FIG. 3b, each stripper roller has a large peripheral groove 30 of rectangular cross-section. Neither of the stripper rollers is provided with a perforator comb 18. The stripper roller 19 is driven by an electric motor 44 mounted behind the panel 10, through reduction gearing 45 and a coupling 46. The other stripper roller 21 is an idler roller after the manner of the idler package-forming roller 13. The stripper rollers 19, 21 are arranged to rotate with a higher peripheral speed than the package-forming rollers 12, 13. In the machine of this particular example, the stripper rollers have the same diameter as the package-forming rollers, and the two driving motors 44, 35 are similar. The difference in roller speeds is provided by the difference in reduction ratios of the two reduction gears 45, 36, so that the final drive to the stripper roller 19 is faster than the final drive to the package-forming roller 12.

The means for feeding the paper tape 15 to the nip 14 of the package-forming rollers is also mounted on the front of the panel 10 and comprises a supply reel 47 for holding a roll of the tape, and three tape guide rollers 48, 49 and 51. Likewise the means for feeding the adhesive tape 16 to the nip 14 of the package-forming rollers comprises a supply reel 52 and three guide rollers 53, 54 and 55. As illustrated in FIG. 1, the two supply reels 47 and 52 are mounted below the package-forming rollers, and the guide rollers associated with each tape are arranged to guide the tape upwards, around the top of the associated package-forming roller and then downwardly into the nip 14 of the rollers. (In FIG. 2, the tapes are omitted for clarity of illustration.) The final guide rollers 51, 55 are positioned with respect to the nip 14 of the package-forming rollers such that there is an angle of about 40° between the two tapes as they enter the nip.

The turns of the adhesive tape 16 on the roll of adhesive tape on the feed reel 52 adhere to each other, so that a certain tension has to be applied to the adhesive tape 16 in order to pull it off the roll. In order to provide a similar tension in the non-adhesive paper tape 15, (in order that the completed package does not curl), tensioning means is provided for the paper tape. In this machine, the tensioning means 56 is provided by a springy blade 57 mounted on a bracket 58 secured to the front of the panel 10, and pressing against the paper tape 15 as it passes over the first guide roller 48. The force with which the blade 57 presses against the tape 15 can be adjusted by means of a screw 59 passing through the bracket 58 and bearing against the blade, thereby adjusting the frictional force between the tape 15 and the blade.

The machine of this example further includes means for feeding a third web 23 into the nip 14 of the packaging rollers, in the form of a supply reel 61, a centralizer 62 and a guide roller 63 all mounted on the front of the panel 10. The tape 23, being very much narrower than the paper tape and adhesive tape (about ¼ inch in width), is wound backwards and forwards along the axial direction of the supply reel 61 which, as illustrated in FIG. 2, is much greater than the width of the tape. The centralizer 62 is provided to bring the tape 23 coming off the supply reel 61 into the correct transverse position, and the guide roller 63 then aligns the tape 23 accurately with respect to the adhesive tape 16. As illustrated in FIG. 1, the supply reel 61 is mounted above and to one side of the packaging rollers, and the tape 23 leaves the guide roller 63 and contacts the adhesive surface of the adhesive tape 16 as the tapes 23 and 16 pass over the second adhesive tape guide roller 54.

The three tape-supply reels 47, 52, 61 are releasably secured to the panel 10 by means of quick release pins 60 which also act as axles for the rotating reels.

The semi-circular groove 31 in the package-forming roller 12 provides a semi-circular aperture in the middle of the nip 14 of the package-forming rollers. The various tape guide rollers are arranged so that they feed all three tapes 15, 16 and 23 into the nip of the package-forming rollers with the longitudinal centre lines of all three tapes superposed on each other and passing through the aperture in the nip of the package-forming rollers. In other words, the three tapes are parallel and centered on the aperture in the nip. The paper tape 15 is adjacent the roller 13 which has a plain peripheral face, whilst the adhesive plastics tape 16 is adjacent the roller 12 which has the groove 31 in its peripheral surface. The adhesive face of the tape 16 faces away from the roller 12 and towards the paper tape 15, and has the narrow tape 23 adhering to the central part of its adhesive face.

Figure 8:
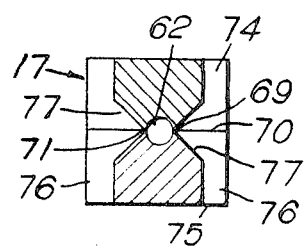
FIG. 8 is a section through the feed tube taken on the line VIII—VIII of FIG. 1.

As previously mentioned, means for feeding a succession of rivets in end-to-end relationship into the nip of the package-forming rollers between the tapes includes a feed tube 17 arranged vertically with its axis along the line of common tangent to the peripheries of the two package-forming rollers at their nip. The feed tube 17 has a cylindrical bore 62 extending centrally throughout its length, the diameter of the bore 62 being very slightly greater than the diameter of the heads of the rivets to be fed down it. Means for feeding a stream of air downwardly through the bore of the tube, to assist in feeding the rivets down it, includes an annular air plenum 63 accommodated inside an enlargement 64 near the top of the tube. The plenum 63 is connected by means of a pipe 65 to the outlet side of an air flow regulator valve 66 mounted on the back of the panel 10. An inlet pipe 67 leads to the inlet side of the valve 66 and can be connected to a source of compressed air. The annular air plenum 63 is connected by means of a number of bores 68, inclined inwardly downwardly at an angle of about 45°, to the main bore 62 of the feed tube near its upper end. The feed tube of the machine of this example is provided with two sets of opposed apertures at different places along its length. These apertures are in the form of longitudinal slots, one pair of slots 69, 71 about one third of the way down the tube and a second pair 72, 73 about two thirds of the way down the length of the tube. As illustrated in FIG. 8, the feed tube 71 comprises two separate members 74, 75 which abut along a longitudinal axial plane 70 of the tube (this construction is adopted for ease of manufacture and assembly). The two diametrically opposed slots of each pair are arranged on this plane 70. The part of the tube immediately outside each slot is cut away to provide a rebate 76, the rebate communicating with the adjacent slot by means of an elongated aperture 77 which tapers inwardly towards the slot.

The feed tube 17 is mounted on the front of the panel 10 by means of a bracket 78 just below the lower pair of slots 72, 73. The bottom end of the feed tube is tapered on two opposite sides to produce two opposed inclined faces 79 converging towards the bottom end of the tube. This allows the bottom of the tube to enter as far as possible towards the nip 14 of the package-forming rollers, between the two converging webs approaching the nip, so that the tube may continue to guide a rivet approaching the nip of the rollers until the rivet is very nearly gripped by the rollers.

Figure 7:
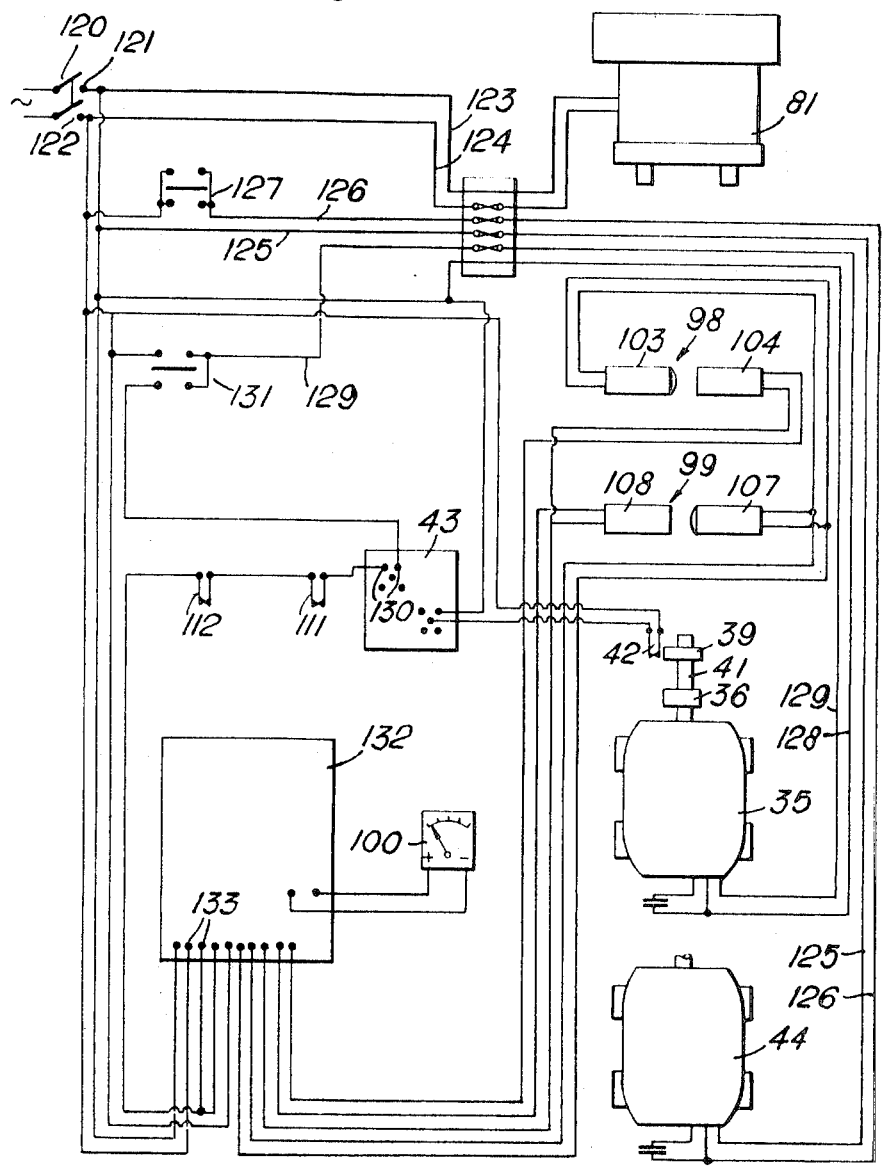
FIG. 7 is a block schematic circuit diagram of the electrical control system of the machine.

In the rivet packaging machine of this example, there are provided two rivet sensing devices at different positions along the feed tube 17. Each rivet sensing device operates by projecting a beam of light through one of the pairs of opposed slots in the feed tube 17. The upper sensing device 98 comprises two housings 101, 102 secured to the front of the panel 10 and extending on opposite sides of the feed tube so that the slots 69, 71 are in alignment between the two housings. The housing 102 contains a light projector 103 comprising an electric bulb and a suitable projection lens, and the housing 101 contains a photoelectric device which is responsive to light, projected by the projector 103 through the two slots 71, 69, falling on it. Likewise, the lower rivet sensing device 99 comprises two housings 105, 106 on opposite sides of the slots 72, 73 the housing 106 containing a light projector 107 and the housing 105 containing a photoelectric device 108. The arrangement of each of these two rivet sensing devices is such that when no rivets are present in the feed tube 17 opposite the sensing device, the light beam is unbroken and the photoelectric device gives a corresponding electrical output. However, when rivets are present in the tube opposite one of the sensing devices, the rivets obscure the light beam across the tube so that the electrical output of the photoelectric device in the sensing device alters appropriately. The electric lamps, and the photoelectric devices, are connected in an electric circuit which is illustrated in FIG. 7, the functioning of which will be described later. An electric meter 100 is mounted on the panel 10 and is connected to indicate when the correct current is flowing through the photoelectric devices.

Rivets are supplied to the top of the feed tube by means of a vibratory hopper 81 of a type which is well known and which need not be described further in the present specification. The rivets are conveyed between the outlet 82 of the vibratory hopper and the top of the feed tube 17 by means of a guideway 83 illustrated in FIGS. 5 and 6. The guideway 83 consists of a block 84 with a channel 85 of T-shaped cross-section cut through it. As illustrated in FIG. 6, the dimensions of the T-shaped channel are such that a rivet to be packaged by the machine can hang in the channel with the shoulders of the T-shaped channel supporting the underside of the head of the rivet and the shank of the rivet received in the lower part of the T-shaped channel without engaging the walls or bottom of the channel. The outlet from the vibratory hopper is of similar form, and the inlet end 86 of the guideway 83 is adjacent to the hopper outlet in the correct alignment so that rivets emerging from the hopper outlet pass into the channel 85. The guideway 83 is not secured to the hopper outlet but can move slightly with respect to it, the hopper outlet overlapping the inlet end 86 of the guideway 83 to accommodate this movement. The channel 85 in the guideway 83 extends from the end 86 of the guideway, and has a right angle bend 87 near its other end. The radially outermost walls of the channel 85 at this right angle bend are radiused so that they guide the succession of rivets around this bend. Immediately beyond the bend 87 the channel 85 ends over a vertical cylindrical bore 88 in the floor of the guideway, the diameter of the bore 88 being very slightly larger than the width of the upper part of the T-shaped channel 85. The guideway 83 is secured over the top of the feed tube 17 so that the bore 88 in the guideway is aligned with the top of the bore 62 in the feed tube 17. The guideway 83 is provided with a clear transparent plastics cover 89 which allows observation of the succession of rivets passing along the guideway and which is easily removable to give access to the channel in case the rivets in it should jam.

The rivet packaging machine of this example includes vibrating means for vibrating at least the uppermost part of the feed tube 17 in order to assist the free and rapid movement of rivets down the tube. In this machine the vibration of the feed tube is linear and transverse to the length of the feed tube, in a direction perpendicular to the main panel 10 of the machine. The vibrating means is provided by a pneumatically-operated vibrator 141 fed with compressed air through a pipe 142 (shown part broken away in FIGS. 1 and 2) from the outlet side of an air flow regulator valve 143, the inlet side of which can be connected by means of a pipe 144 to a source of compressed air. The vibrator 141 is of a known type which incorporates a spool valve which, on the application of compressed air to the vibrator, reciprocates automatically. The vibrator 141 is secured to the feed tube 17 near the latter's upper end just below the enlargement 64. The guideway 83 attached to the top of the feed tube vibrates with the uppermost part of the feed tube, and, as mentioned previously, the guideway can move slightly with respect to the hopper outlet to accommodate this. In use, rivets pass along the guideway 83 under the urging of the rivets behind being pushed out of the hopper outlet.

The packaging machine of this example is provided with a package guide 91 to guide, if necessary, the package emerging from the nip 14 of the package-forming rollers into the nip 22 of the stripper rollers. As illustrated in FIG. 1, the guide extends substantially the whole distance between the nips of the two sets of rollers and comprises two strips 92, 93 of rigid transparent plastics material spaced apart on opposite sides of the common tangent line joining the two nips 14, 22. These two strips 92, 93 are secured to the front of the panel 10 by means of two brackets 94 and 95. The two strips 92, 93 are each wider than the packaged strip which passes along between them, and their lowermost parts are joined together at opposite edges by means of two further transparent plastics strips, one of which is shown at 96 in FIG. 1. Thus whilst the upper part of the package guide 91 is open front and back, its lower part is in the form of a tube of rectangular cross-section from the lowermost end 97 of which the continuous length of package emerges and is fed into the nip 22 of the stripper rollers.

The packaging machine of this example is further provided with means for sensing if a packaging tape starts to wrap itself around one or other of the package-forming rollers. This sensing means comprises a pair of micro-switches 111, 112 associated respectively with the package-forming rollers 12, 13. Each micro-switch is mounted on the front of the panel 10 underneath the associated package-forming roller and has a low-inertia actuating arm 113 or 114 projecting outwardly from the top of the micro-switch, with its upper end normally lying (in the case of the arm 113 on grooved roller 12) within the groove 31 or (in the case of non-grooved roller 13) on the circumferential face of the roller. If, due to some fault, a package-forming tape starts to wrap around one of the package-forming rollers, then the leading end of the tape meets the actuating arm of the sensor (the paper tape 15 on non-grooved roller 13 would carry rivets round with it), the arm is displaced and operates the micro-switch, which is arranged to switch off the motor 35 driving the package-forming rollers.

FIG. 7 shows the block circuit diagram of the electrical control system of the machine of this example. Main electric power is supplied to terminals 121, 122 through a double-pole isolator switch 120. The vibratory rivet hopper 81 is electrically driven, has its own internal on/off switch, and is connected directly to the power terminals 121, 122 by lines 123, 124. The stripper roller motor 44 is connected to the power terminals by lines 125, 126, a jog/run switch 127 being connected in the line 126. The package-forming roller motor 35 is supplied with power through two lines 128, 129. The line 128 is connected directly to one of the power terminals 121. The other line 129 is connected to one side of a second jog/run switch 131. The jog/run switch 131 is connected so that in the "jog" position the line 129 is connected directly to the other electric power terminal 122. This provides for jogging or inching of the package-forming roller motor under direct manual control. However, when the jog/run switch 131 is in the "run" position, the line 129 to the motor 35 is connected to the power terminal 122 in series with two terminals 130 on the electromagnetic batch counter 43, with the two tape sensor micro-switches 111 and 112, and with two terminals 133 of an electromagnetic control unit 132. The batch counter 43 is arranged so that a relay-operated switch connecting the terminals 130 is normally closed, but is opened when the number of actuations of the micro-switch 42 operated by the cam 49 is equal to a predetermined number set in the batch counter. In this way the package-forming roller motor 35 can be arranged to automatically switch off after a predetermined number of lengths of package have been manufactured. The switch across the terminals 130 can also be set closed by a manual control, so that the machine can be run continuously without the automatic switch-off. The electromagnetic control unit 132 includes a relay-operated switch connecting the terminals 133. This switch is controlled (by means of a logic circuit arrangement which is not part of the present invention) so that the switch will be closed only when the photoelectric device 108 of the lower rivet sensing device 99 indicates that there are rivets in the feed tube 17 opposite the lower sensing device. The photoelectric cell 104 of the upper rivet sensing device 98 is also connected to the control unit 132, and the logic circuit arrangement in the control unit is so arranged that, once the switch 133 has opened due to the absence of rivets at the lower rivet sensing device 99, the switch 133 will not be closed again until both the upper rivet sensing device 98 and the lower rivet sensing device 99 indicate that there are rivets in the feed tube 17 opposite them. As previously mentioned, actuation of either of the tape-sensor micro-switches 111, 112 also switches off the package-forming roller motor 35.

The lamps of the light projectors 103, 107 of the rivet sensors are also fed from the control unit 132, the meter 100 being connectd to indicate the current flowing through the photocells.

The operation of this rivet packaging machine is as follows. Reels of paper tape 15, adhesive tape 16 and narrow masking tape 23 are fitted to the machine and the respective tapes threaded around their respective guides, in the manner previously described, and into the nip 14 of the package-forming rollers. The package-forming rollers are inched by using the "jog" position of the jog/run switch 131 to draw the tapes through the nip of the package-forming rollers, which seals the tapes 15, 16 together along each edge part where the adhesive tape 16 is not masked by the narrow tape 23. The air lines 67 and 144 are connected to a suitable source of compressed air, the regulator valve 66 opened to provide a strong blast of air downwardly through the bore 62 of the feed tube 17, and the valve 143 adjusted to actuate the feed tube vibrator 141. The air in the bore of the feed tube escapes from the tube through the slots 69, 71 and 72, 73. A sufficient quantity of rivets having been put in the vibratory hopper 81, the hopper is switched on so that a succession of rivets, each in contact with the next, is fed along the guideway 83, under the mechanical urging of the vibration of the hopper outlet. As each rivet in turn reaches the vertical bore 88 at the end of the guideway, it is sucked downwards by the airflow in the topmost part of the bore 62 of the feed tube so that it is projected at high speed vertically down the bore. The switch 131 is set to "run," but as the package-forming rollers 12, 13 are not yet rotating, the lowermost rivet in the feed tube rests on the tapes 15, 23 almost in the nip 14 of the rollers, the lowermost end of the feed tube 17 being so close to the nip of the rollers that there is insufficient room for a rivet to escape or even fall out of alignment. A column of rivets builds up in the feed tube and when it reaches the upper sensing device 98, the motor 35 will be actuated to drive the package-forming rollers. (The switch 127 has previously been set to the "run" position so that the stripper rollers are already running.) FIG. 4 illustrates diagrammatically the package-forming operation which takes place in the nip of the package-forming rollers. The tapes 15, 16 and 23 are drawn through the nip of the rollers by virtue of the frictional contact with the rubber surfaces of the rollers of the tapes 15 and 16. The succession of rivets 140 emerging from the bottom end of the feed tube 17 is entrained between the tapes, the rivets being aligned with the semicircular aperture in the nip of the rolls formed by the groove 31 in the surface of roller 12. The longest diameter of this aperture (when the rollers are undistorted) is about the same as the head diameter of the rivets, so that as the packaging tapes and the rivets pass through the nip of the rollers, the wall of the grooves 31 in the roller 12, and the opposing part of the surface of the rollers 13, grip the rivets tightly and deform the tapes 16 and 23 around the rivets, in so doing supporting the tapes and the rivets with the latter in their end-to-end relationship. Since the face of the roller 13 is plain, the paper tape 15 which is in contact with it is not deformed to any great extent (although the rivet heads may break through it slightly). The plastics tapes adjacent the grooved roller 12 are deformed (between the rivets and the groove) to a much greater extent than is the paper tape 15. The pressure between the two rollers 12, 13 at their nip 14 also presses the tapes 15, 16 firmly together as they pass through the nip. By virtue of the self-adhesive surface of the tape 16, this pressing together simultaneously seals the tape 16 firmly to the narrow masking tape 23 and also to the edge parts of the paper tape 15, on both sides of the row of rivets. As a succession of rivets in end-to-end contact relationship is continuously fed between the packaging tapes, into and through the nip of the continuously rotating rollers 12 and 13, the above described packaging operation is performed continuously, so that there emerges below the nip of the rollers 12 and 13 a continuous strip of package 141. As previously mentioned, the similarity of tension in the two tapes 15 and 16 means that the package 141 does not tend to curl.

Figure 9:
FIG. 9 is a plan view of part of a package strip manufactured by the machine.
Figure 10:
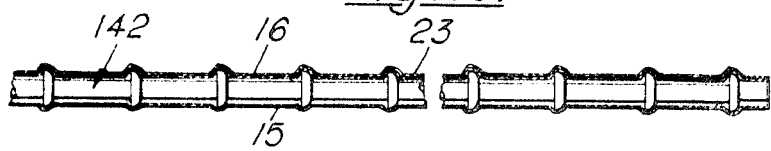
FIG. 10 is an elevation, with part of the package shown cut away, of the strip shown in FIG. 9.

FIG. 9 shows part of the formed package. The formed package 141 consists of a continuous row 142 of rivets in end-to-end relationship, the tail of each rivet being in contact with the head of the next succeeding rivet. The row of rivets is positioned down the middle of the two opposed tapes 15 and 16 which are deformed about the rivets to support them and retain them in their end-to-end alignment, the tape 16 being sealed to the tape 15 except for a central strip overlying the row of rivets where the narrow masking tape 23 masks the adhesive surface of the tape 16 and prevents adhesive from coming into contact with the row of rivets. An uncovered strip 143 extends along each edge of the paper tape 15.

The continuous strip 141 of packaged rivets emerging below the nip 14 of the rollers 12 and 13 is perforated at regular intervals by means of the perforator comb 18 in the roller 12, the length between each perforation being equal to the circumference of the roller 12, as previously mentioned. The strip 141 passes down the guide 91 and into the nip 22 of the stripper rollers 19, 21. As previously described, these rollers rotate with a higher peripheral speed than the package-forming rollers, i.e. with a higher peripheral speed than the linear speed of the package strip 141 being fed into their nip. The tension thus exerted on the strip 141 between the two sets of rollers breaks the strip apart at the perforation between the two sets of rollers, and the thus separated length of package passes downwardly through the rollers 19 and 21. The large grooves 30 in these rollers allow the central, rivet-containing part of the packages to pass through the nip without being touched; only the edge parts of each package formed of packaging tapes alone, being gripped by the stripper rollers, to avoid damage to the packages. A hopper or other collecting bin may be placed underneath the rollers 19 and 21 to collect the separated lengths of package. Since the distance between the nip 14 of the package-forming rollers 12 and 13, and the nip 22 of the stripper rollers 19 and 21, is more than one length between the package perforations, but less than two such lengths, when the leading end of the continuous strip 141 enters the nip 22 of the stripper rollers there is always one, and only one, set of perforations in the strip between the two sets of rollers.

As previously described, if for some reason the supply of rivets into the feed tube 17 is interrupted, when the top end of the column of rivets reaches the lower rivet sensing device 99 that device will be actuated to switch off the package-forming roller motor 35, so that packaging tapes are not fed through the rollers in the absence of a continuous succession of rivets being fed between the tapes. As previously described, the package-forming roller 35 will not start again until the column of rivets has built up in the feed tube to at least the position of the upper rivet sensing device 98. Since this upper rivet sensing device 98 is positioned at a distance away from the nip 14 of the package-forming rollers at least equal to the circumference of the roller 12, i.e. at least equal to one length of perforated package, operation of the package-forming roller motor will be resumed only when there are at least a sufficient number of rivets in the feed tube to provide at least one complete length of package strip.

FIGS. 11 and 12 illustrate a modification of the packaging machine described with a reference to the FIGS. 1 to 10. This modification provides means within the feed tube 17 near its lower end adjacent to the packaging station for positively urging of rivets towards the packaging station at a rate higher than the rate at which rivets pass through the nip of the package-forming rollers 12 and 13. A packing wheel 150 has its periphery provided by a tyre 151 of wear-resistant friction material in the form of granulated cork bonded in rubber. The periphery of the wheel protrudes through a suitable slot 152 in the wall of the feed tube 17 so that the surface of the tyre 151 enters the bore 62. The wheel 150 is secured to a spindle 153 mounted in a swinging arm 154. The swinging arm 154 is pivoted on a spindle 155 mounted on a block 156 adjustably secured to the main machine panel 10 by means of a clamping bolt 157. The packing wheel 150 is belt-driven from the driven packaging roller 12. A large diameter pulley 158 is secured to the drive shaft 33 of roller 12, drives a belt 159 which in turn drives a pulley 161 mounted for free rotation on spindle 155. The pulley 161 has a second groove which carries a second belt 162 which drives a pulley 163 secured to the spindle 153 carrying the packing wheel 150. The geometry of the belt drive is such that the periphery of the packing wheel tyre 151 has a linear speed of about one and a half times the linear speed of the periphery of the packaging rollers 12 and 13. The tyre 151 on the packing wheel 150 is urged into contact with the succession of rivets passing down the bore 62 by means of a spring 164 connected between the swinging arm 154 and an adjustable spring tensioner 165 mounted on the machine panel 10. The swinging arm 154 can pivot about the spindle 155 under the tension of the spring 164, a stop being provided so that the tyre 151 does not press the rivets into frictional contact with the wall of the tube 17 sufficiently to impede their progress.

It is found that the use of this packing wheel to positively urge rivets towards the packaging station at a speed higher than the speed at which they pass through the packaging station is advantageous in insuring that there are no gaps between rivets arriving at the nip of the rolls, so that there are no gaps in the column of rivets in the final package.

Figure 13:
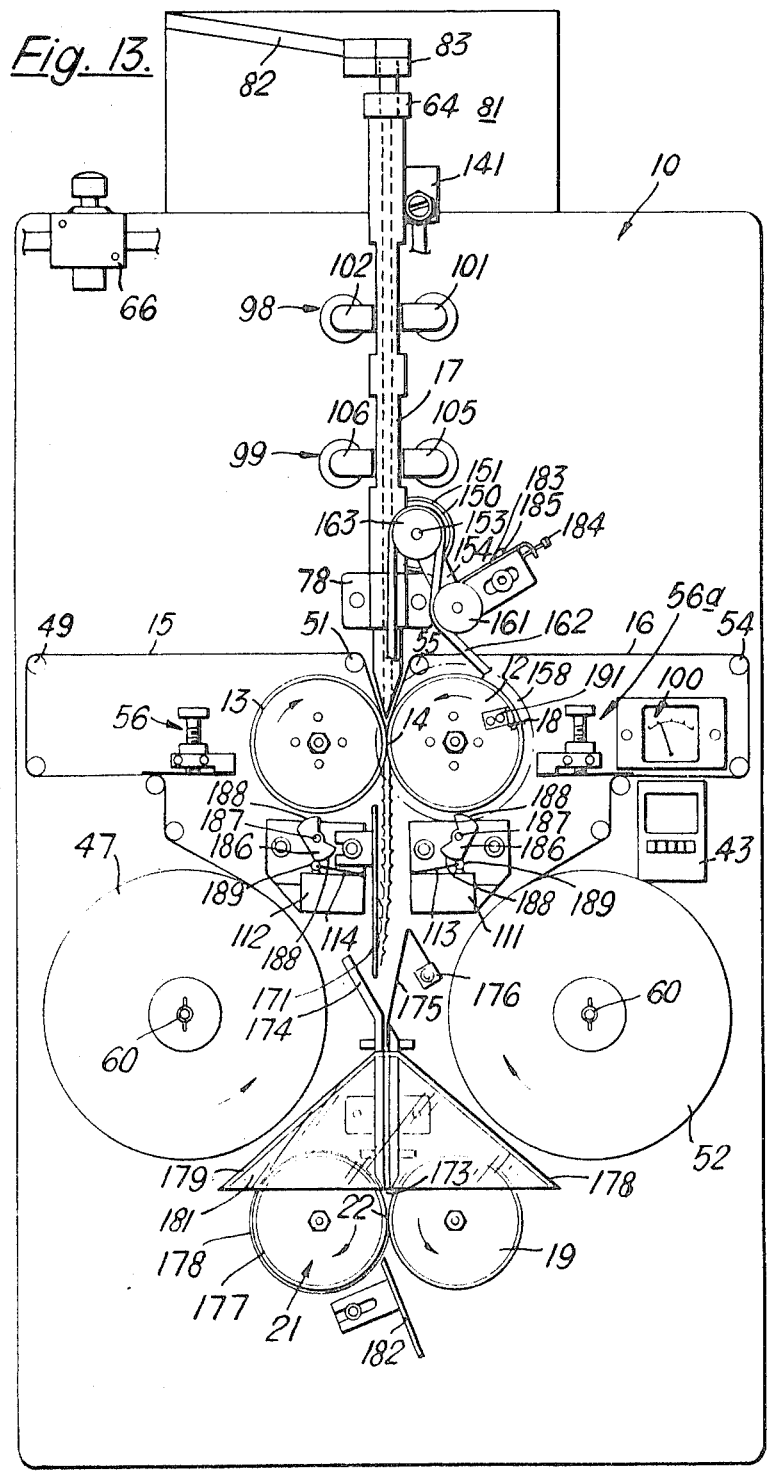
FIGS. 13 and 14 are elevations, corresponding to FIGS. 1 and 2, of a second rivet packaging machine.
Figure 14:
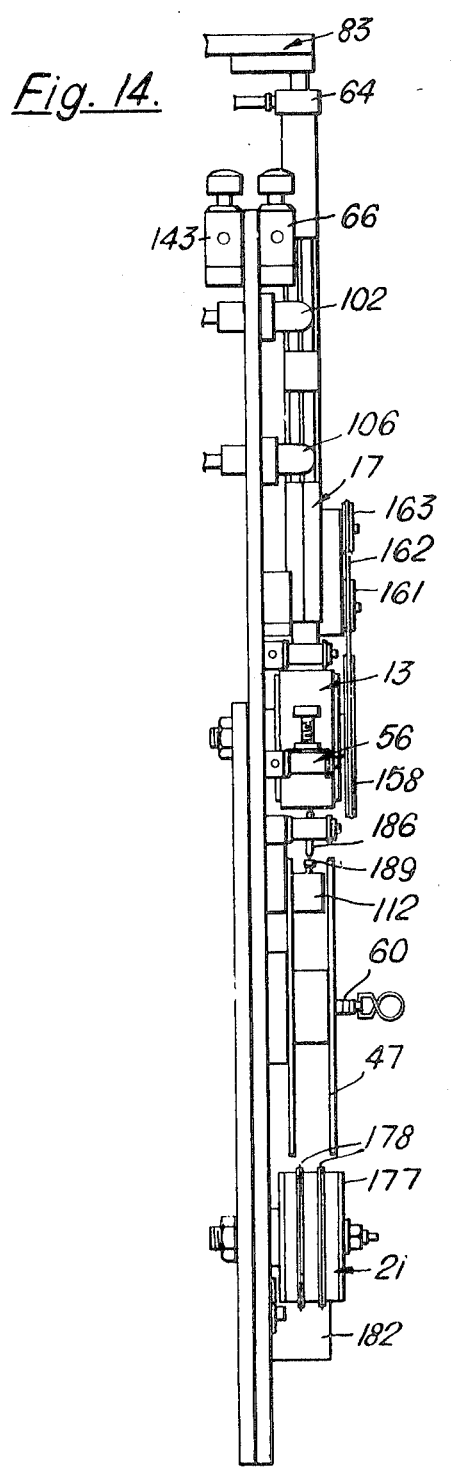

The second example rivet packaging machine illustrated in FIGS. 13 and 14 is essentially similar in construction and operation to that illustrated in FIGS. 1 to 10 modified as illustrated in FIGS. 11 and 12. Like parts in the two machines are denoted by like reference numerals.

The major difference of the second machine is that it uses only two packaging tapes 15 and 16, one face (i.e. that one which will contact the other tape) of each tape being coated with a low tack latex film which does not normally adhere with any great strength except to the similar latex film on the other tape. Although this latex film adheres lightly to the rivets in the pack, it is found that when the paper tape is stripped away from the rivet the adhesive has not contaminated the rivet. Consequently there is no need to provide a narrow masking tape in order to protect the rivets from the adhesive. The surfaces of both packaging rollers 13 and 15 are similar i.e. both grooved or both ungrooved. It will be seen from FIG. 13 that the path of each tape from its feed roll 47 or 52 to the nip 14 of the packaging rollers is also slightly different to that in the first example machine. In the second machine, a second tape tensioner 56a is provided for the right hand tape 16, in addition to the tensioner 56 for the left hand paper tape 15. In practice, a greater tension is imparted to the left hand tape 15, so that the package (not shown in FIGS. 13 and 14) emerging from below the nip 14 of the packaging rollers tends to curl towards the left (as viewed in FIG. 13). The single package guide 91 of the first machine is replaced in the second machine by two separate guide sections. The upper guide section comprises a single adjustable guide plate 171 positioned on the left hand side of the path between the nip 14 of the packaging rolls and the nip 22 of the stripper rolls, so that the leading end of the formed package emerging below the nip 14 impinges on this guide plate 171. The lower half of the packaging guide (not shown in FIG. 14 for clarity of illustration) comprises a four-sided rectangular section tube-like guide 172 terminating at its lower end 173 just above the nip 22 of the stripper rollers, for accurately aligning the packaging in the nip 22. The upper end of the lower guide comprises an inclined plate 174 on the left hand side, for guiding the package from the lower end of the guide plate 171 into the lower guide 172, and a spring guide 175 on the right hand side, also inclined and with its lower end within the top of the guide tube 172. The spring guide 175 comprses a single length of wire in elongated U-form, its lower folded end being within the top of the guide tube 172 and its upper end bent downwardly and secured in an anchor block 176 mounted on the main machine panel 10. The rectangular guide tube 172 aligns the formed package entering the nip 22 of the stripper rollers not only in the direction perpendicular to the axes of the rollers 19 and 21 but also in the direction parallel to those axes. The driven stripper roller 21 in this second machine has a smooth metal surface 177 and is provided with two continuous annular projecting ribs 178. These ribs are so spaced and aligned that, as the formed package passes through the nip 22 of the rollers, a continuous longitudinal fold or crease is produced along each side of the package, each fold being approximately mid way between the column of packaged rivets down the centre and the edge of the superposed paper tapes. These folds help to increase the stiffness of the finished packaged strips, thereby making them more easy to handle. Corresponding annular grooves are provided in the driven roller 19. In this second machine, the various parts 171, 172 and 174 of the guides are manufactured of transparent plastics material e.g. "Perspex" (trademark), as also are two sloping guards 178 and 179 which, as illustrated in FIG. 13, separate the stripper rollers 19, 21 from the feed rolls 52 and 47 respectively. These guides prevent the latex coated paper tapes from coming into contact with the stripper rollers when the machine is being initially threaded up, and also in the event that either paper tape should break at or near its feed roll. A further clear transparent plastic sheet 181, triangular in shape, extends between the guards 178 and 179 and covers the guide tube 172 and the upper part of the stripper rollers 19 and 21. Below the nip 22 of the stripper rollers is provided a further adjustable inclined guide plate 182, which deflects the parted packaged lengths sideways and facilitates their proper stacking in a box or hopper which may be positioned underneath the stripper rollers.

In the machine illustrated in FIGS. 13 and 14, a minor modification to the drive to the packing roller 150 is that it comprises a single belt 162 which passes around both the driving pulley 158 on the driven packaging roller 12 and also around the pulley 163 secured to the packing wheel spindle 153. The pulley 161 is merely an idler pulley used to impart tension to the belt 162, which is slightly resilient. This resilience of the drive belt is used to urge the packing wheel 150 towards and into frictional contact with the rivet passing down the feed tube 17. An adjustable stop 183, including an adjusting screw 184 and a locking screw 185, is provided to adjust the limiting position of the packing wheel 150.

A further modification in the second example machine is in the mechanical arrangements of the two tape sensing micro-switches 111, 112. Each micro-switch is provided with a butterfly-shaped cam 186 mounted for free pivoting movement on a pivot 187. Each butterfly cam has two part-circular surfaces 188 centered on its pivoting axis. In use, the lower surface contacts a roller 189 on the end of the actuating arm 113 or 114 of the micro-switch thus holding the micro-switch in the closed position. The upper curved surface 188 is positioned very close to the upper side of the respective packaging roller 12 or 13 and in the plane containing the centre line of the column of rivets passing through the packaging rollers. It is found that if one of the paper packaging tapes breaks so that its supply and feed through the nip 14 of the packaging rollers is discontinued, the rivets adhere to the other tape and the slightly tacky latex film on that tape adheres sufficiently to the opposite packaging roller to carry the tape and rivets around that roller. When the rivets meet the upper end of the butterfly cam 186 underneath that roller, they displace the cam about its pivoting axis, thus opening the micro-switch and causing the packaging machine to stop, as described with reference to the first example of the machine.

A further minor modification is that the perforator 18 on the driven packaging roller 12 is provided with external adjusters, one of which is shown at 191 in FIG. 13, for adjusting its position in a radial direction.

In other respects the construction and operation of the second example machine illustrated in FIGS. 13 and 14 is substantially the same as that of the first example machine illustrated in FIGS. 1 to 10 as modified in the way illustrated in FIGS. 11 and 12.

The lengths of package produced by the machines of these examples are intended for loading the tubular rivets on the mandrel of a repetition riveting tool of the type widely known under the registered trademark "Chobert." The mandrel is inserted, tail end first, through the aligned bores of the rivets in a length of package, and in such a direction that the tail ends of the rivets are towards the enlarged head of the mandrel. When all the rivets are on the mandrel, the packaging tapes are torn away and the mandrel is ready for insertion in the tool. It will be apparent that, in order for the rivets to be quickly and easily loaded on to the mandrel, the bores of all the rivets in each length of package must be in alignment. The packaging machines described in the foregoing examples achieve this result. They also allow the packaging to proceed at high speed and automatically.

The invention is not restricted to the details of the foregoing examples. For instance, different packaging materials may be employed. The widths of the packaging tapes may be selected to suit the size of rivet to be packaged. Both packaging rollers of the first example machine could have a groove in the periphery, although this has been found to produce a package which is not so neat and not so tight, since the paper tape is then deformed between successive rivet heads.

It will be noted that, in the example machines described above, the articles to be packaged are headed rivets, so that each rivet has a considerable radial enlargement (its head) at one end, the rivets being fed between the packaging tapes tail first and head last. It has been found that this mode of packaging provides a package with the rivets more closely packed and evenly aligned than does feeding the rivets between the tapes head first and tail last. It is believed that this improvement is due to the enlarged head of each rivet in the nip of the package-forming rollers holding the tapes apart slightly to provide a channel into which the tail of the next rivet can enter and approach the first rivet more closely. Furthermore by feeding the narrower tail end of each rivet first into the nip of the package-forming rollers a certain amount of self-alignment of the rivet is achieved which does not occur if the widest part of the rivet is fed in first.

The feed tube need not be positioned absolutely vertically, provided that the rivets will, in practice, slide down it. Similarly, it is possible to omit vibration of the feed tube, or the stream of air along it, or both, again provided that, in practice, the rivets will feed down the tube. It has been found that such alterations do not allow the machine to work so fast, however.

When using a vibratory hopper, as in the machines of the examples described above, the hopper may be rigidly coupled to the top of the feed tube in order to provide vibration of the feed tube. The horizontal guideway 83 employed in the machines of these examples has to be vibrated to allow rivets to pass along it under the rather weak urging of the rivets behind being fed by the hopper outlet. Such vibration of the guideway may of course be derived from the vibration of the hopper outlet, or (as in these examples) from a separate vibrator.

We claim:

1. Packaging apparatus for packaging a plurality of hollow rivets or the like in end-to-end relationship comprising:
    a packaging station;
    packaging material feeding means for feeding packaging material to said packaging station;
    packaging means at said packaging station for enclosing a succession of articles in the packaging material to form an elongated package with the articles in end-to-end relationship and with their bores substantially in alignment;
    an article feeding means for feeding a succession of the articles to be packaged to said packing station in end-to-end relationship, said feeding means including a guide defining an internal passageway through which the succession of articles is fed and from which they emerge at said packaging station and means for providing a stream of gas along at least a part of said internal passageway for assisting the movement of articles along said passageway.

2. Packaging apparatus for packaging a plurality of hollow rivets or the like in end-to-end relationship comprising:
    a packaging station;
    packaging material feeding means for feeding packaging material to said packaging station;
    packaging means at said packaging station for enclosing a succession of articles in the packaging material to form an elongated package with the articles in end-to-end relationship and with their bores substantially in alignment;
    an article feeding means for feeding a succession of the articles to be packaged to said packaging station in end-to-end relationship, said feeding means including a guide defining an internal passageway through which the succession of articles is fed and from which they emerge at said packaging station and means for vibrating at least a part of said internal passageway for assisting the movement of articles along said passageway.

3. Packaging apparatus for packaging a plurality of hollow rivets or the like in end-to-end relationship comprising:
    a packaging station;
    packaging material feeding means for feeding packaging material to said packaging station;
    packaging means at said packaging station for enclosing a succession of articles in the packaging material to form an elongated package with the articles in end-to-end relationship and with their bores substantially in alignment;
    an article feeding means for feeding a succession of the articles to be packaged to said packaging station in end-to-end relationship, said feeding means including a guide defining an internal passageway through which the succession of articles is fed and from which they emerge at said packaging station and sensing means for sensing the presence or absence of articles at at least one position along said passageway.

4. Packaging apparatus according to claim 3, in which said sensing means is arranged to control actuation of said packaging means, so that, when said sensing means sense the absence of articles, actuation of said packaging means is stopped.

5. Packaging apparatus according to 3, in which there are provided first sensing means at a first position along said passageway spaced from said packaging station, and second sensing means at a second position along said passageway which is spaced further along said passageway away from the packaging station than is the first position, said first and second sensing means being operatively connected to said packaging means so that actuation of said packaging means is stopped when said first sensing means senses the absence of articles in said passageway at said first position, and is not started again until both said first and second sensing means sense the presence of articles in said passageway at said first and second positions respectively.

6. Packaging apparatus according to claim 3, in which said passageway comprises a tubular guide and said guide is provided with a pair of opposed apertures in its wall at least one sensing position, the associated sensing means comprising means for passing a beam of radiation across the interior of said tubular guide through said pair of apertures, and radiation detecting means for detecting when the beam is broken by the presence of an article or articles in said guide between said apertures at said sensing position.

7. Packaging apparatus according to claim 3, which includes means for cutting or perforating the elongated package into predetermined lengths.

8. Packaging apparatus according to claim 7, which includes sensing means for sensing the presence or absence of articles in said guide, and in which said sensing means is arranged to sense the presence or absence of articles at a position along said guide spaced there along away from said packaging station by a distance adequate to contain, in use of the apparatus, at least a sufficient number of articles to fill one of the said lengths of package.

9. Packaging apparatus according to claim 8, which includes first and second sensing means at first and second positions along said guide, and in which the second position is spaced from said packaging station by a distance which is adequate to contain, in use of the apparatus, at least a sufficient number of articles to fill one of said lengths of package.

10. Packaging apparatus according to claim 3, in which said packaging means comprises a pair of rollers arranged to form nip, said nip constituting the said packaging station.

11. Packaging apparatus according to claim 10 in which one of said rollers includes a device for perforating the elongated package at predetermined intervals along its length.

12. Packaging apparatus according to claim 11, in which the apparatus includes separating means for separating the lengths of package between said intervals.

13. Packaging apparatus according to claim 12, in which said separating means comprises a second pair of rollers into which the package is fed after its emergence from the packaging rollers, said second pair of rollers being positioned with their nip at a distance away from the nip of the packaging rollers which is greater than one length of package but less than two lengths of the package, said second pair of rollers being arranged to rotate with a circumferential speed higher than that of the package forming rollers.

14. Packaging apparatus according to claim 10, in which one of said rollers includes means to cut the elongate package into predetermined lengths.

15. Packaging apparatus according to claim 3, including means within said internal passageway adjacent said packaging station for positively urging articles toward said packaging station at a rate higher than the rate at which they pass through said packaging station, thereby to ensure the arrival at said packaging station of a succession of articles each in contact with the adjacent articles to be packaged.

16. Packaging apparatus according to claim 15, in which the said urging means is provided by the periphery of a wheel protruding into said internal passageway to engage articles passing therealong, the wheel being driven (when the packaging apparatus is in operation) so that its periphery moves at a speed higher than the speed at which the succession of articles can pass through the packaging station.

17. Packaging apparatus according to claim 16, in which the periphery of said wheel moves at about one and a half times the said speed of the articles through said packaging station.

References Cited

UNITED STATES PATENTS 2,752,742    7/1956    McDowell et al. _____ 53—180

TRAVIS S. McGEHEE, Primary Examiner

U.S. Cl. X.R.

53—180